Aug. 25, 1936.  L. C. MILLS  2,052,416
PNEUMATIC TIRE
Filed June 2, 1932
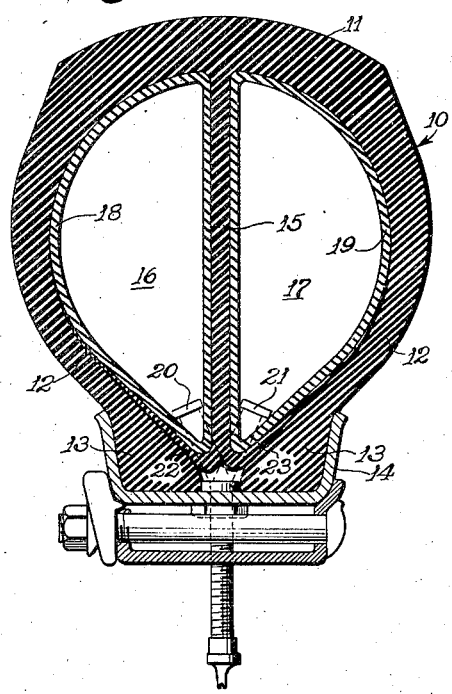
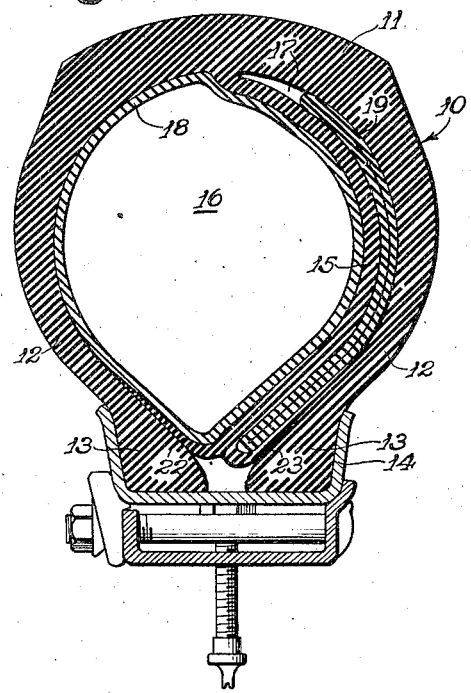
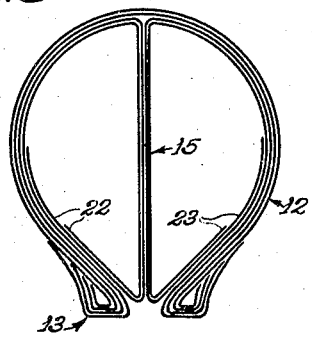
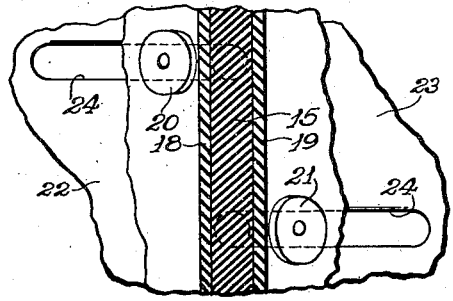
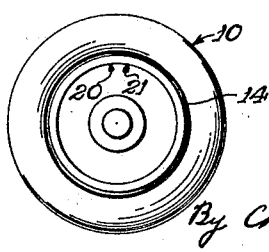
Inventor
Lawrence C. Mills
By Chindahl, Parker & Carlson
Attorneys Patented Aug. 25, 1936

2,052,416

UNITED STATES PATENT OFFICE 2,052,416

PNEUMATIC TIRE

Lawrence C. Mills, Chicago, Ill.

Application June 2, 1932, Serial No. 614,906

1 Claim. (Cl. 152—22)

My invention relates to pneumatic tires for vehicles, and has particular reference to a tire provided with two inner tubes so that upon the deflation of one tube, the other tube will carry the load without the necessity of immediate attention.

An important object of the present invention resides in the provision of a tire having a novel integral inner partition means defining separate compartments for the inner tubes.

Another object is to provide a partition means of the foregoing character which will not interfere with the normal shape and resiliency of the tire, which is simple and inexpensive in construction, reliable and efficient in use and not likely to crimp or in any way injure the inner tubes, and which readily permits removal or insertion of the inner tubes.

Further objects and advantages will become apparent as the description proceeds.

In the accompanying drawing, Figure 1 is a transverse sectional view of an inflated tire embodying the features of my invention.

Fig. 2 is a view similar to Fig. 1 but showing the tire with one of the inner tubes deflated.

Fig. 3 is a somewhat diagrammatic transverse sectional view of the fabric portion of the tire.

Fig. 4 is a fragmentary detail view of the partition.

Fig. 5 is a side view on a reduced scale of the tire and wheel assembly.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claim.

Referring more particularly to the drawing, the tire constituting the preferred embodiment of the invention comprises in general an outer casing 10 of standard construction having an outer peripheral tread wall 11 and side walls 12 terminating in peripheral beads 13 adapted to seat on the usual wheel rim 14.

Formed integral with the casing 10 centrally of the tread wall 11 and normally extending diametrically through the interior thereof is a vertical annular partition wall 15 forming two lateral compartments 16 and 17. Two inner tubes 18 and 19 provided respectively with suitable valve fittings 20 and 21 are inserted respectively in the compartments 16 and 17, and bear against opposite sides of the partition wall 15.

The inner peripheral edge of the partition wall 15 is formed integral with two oppositely extending flaps 22 and 23 which are adapted to lie against the side walls 12 and particularly to close the peripheral opening between the beads 13.

The flaps 22 and 23 are long and gradually tapered in order to afford a smooth interior not likely to pinch or crimp the inner tubes 18 and 19 and to provide a reenforcing covering substantially enveloping the inner portions of the tubes. Thus, the flaps each extend through approximately one-fourth of the transverse circumference of the casing 10.

The flaps 22 and 23 and the partition wall 15 also are thin and flexible so that the normal shape and resiliency of the tire when inflated will not be impaired and that in the event of one inner tube becoming deflated, the wall will yield readily to the expansion of the remaining tube.

The partition wall 15 may be made of any suitable yieldable or flexible material. In the present instance, it consists of four plies of rubber impregnated fabric. Preferably, the two inner plies of cord fabric forming the side walls 12 of the casing 10 meet and are joined at the center of the tread wall 11 to form the four ply partition wall. At the inner peripheral margin of the partition wall 15, the four plies again split to form the flaps 22 and 23. The two outer plies of the partition wall 15, which constitute the inside plies of the flaps, are shorter in length than the two intermediate plies so that the flaps are gradually tapered in thickness and merge smoothly with the interior of the casing 10. Thus, these outer plies may extend one-half the length of the flaps 22 and 23.

Suitable openings 24 are provided in the flaps 22 and 23 for the reception of the air valve fittings 20 and 21 which may be of any suitable construction. In the present instance, they are entirely separate of each other and have bent valve stems as shown in Fig. 1 so that the inner tubes are also independent of each other and capable of being used interchangeably in either side of the tire casing 10. The openings 24 (see Fig. 4) are provided in the form of elongated slots with rounded side edges extending laterally of the casing 10 and permitting the flaps 22 and 23 to slide freely relative to the valve stems.

It will be evident that when both inner tubes 18 and 19 are fully inflated, as shown in Fig. 1, the partition wall 15 will be held erect, and the flaps 22 to 23 will be symmetrically disposed to enclose the tubes and reenforce same at the sides. In the event that either one of the inner tubes becomes deflated, for example either through a puncture, blowout or leaky valve, the other of the inner tubes will expand to assume the full inner space of the casing 10, and thereby will maintain the tire sufficiently inflated to avoid any necessity for immediate attention. In expanding, the inner tube presses the partition wall 15 to one side where it and the collapsed tube serve to close the leak if present in the casing 10. By reason of the slots 24, the flaps 22 and 23 may be partially displaced to accommodate movement of the partition wall 15. The aforesaid adjustment is readily effected without crimping the inner tubes by reason of the smooth interfit of all the parts, and the pliancy and shape of the partition wall 15 and flaps 22 and 23. The partition wall 15 substantially strengthens the outer casing, and reduces the likelihood of punctures and blowouts, thus eliminating an element of danger heretofore present in single tube tires.

I claim as my invention:

In a pneumatic tire, in combination, an outer casing having a peripheral tread wall, side walls and spaced inner peripheral beads, and having an inner lining of a plurality of plies of rubber impregnated cord fabric, a thin annular radial flexible partition wall extending diametrically through the interior of said casing and normally bisecting same into two lateral compartments semi-circular in cross-section, the outer peripheral edge of said partition wall being integral with said casing at the center of said tread wall, two separate interchangeable inner tubes arranged respectively in said compartments and having valve fittings with stems bent into the plane of the tire, and two thin, elongated gradually tapered oppositely extending flexible side flaps joined with the inner peripheral edge of said partition wall and overlapping the adjacent inner portion of said tubes, said flaps extending laterally through approximately one-fourth of the transverse circumference of said casing and having elongated laterally extending slots receiving said stems, said partition wall being formed of the two inner plies of said lining at each side jointed at the center of said tread wall to form four plies and again split at the inner periphery to form said flaps.

LAWRENCE C. MILLS.